US012749893B2

(12) United States Patent
Bhattacharya et al.

(10) Patent No.: US 12,749,893 B2
(45) Date of Patent: Sep. 29, 2026

(54) SYSTEM FOR ACCOMMODATING ALTERNATING CURRENT AND DIRECT CURRENT PRODUCTION, DISTRIBUTION, AND CONTROL

(71) Applicant: Schneider Electric USA, Inc., Andover, MA (US)

(72) Inventors: Subhadeep Bhattacharya, Andover, MA (US); Satish Rajagopalan, Andover, MA (US); Jaser Faruq, Andover, MA (US); Colin Scott, Andover, MA (US); Arun Venugopal, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 18/826,895

(22) Filed: Sep. 6, 2024

(65) Prior Publication Data

US 2026/0074517 A1 Mar. 12, 2026

(51) Int. Cl.

| | |
|---|---|
| ***H02J 3/007*** | (2026.01) |
| ***B60L 53/51*** | (2019.01) |
| ***B60L 53/53*** | (2019.01) |
| ***B60L 55/00*** | (2019.01) |
| ***H02J 3/32*** | (2006.01) |
| ***H02J 3/38*** | (2006.01) |
| *H02J 101/24* | (2026.01) |

(52) U.S. Cl.

CPC .............. *H02J 3/007* (2020.01); *B60L 53/51* (2019.02); *B60L 53/53* (2019.02); *B60L 55/00* (2019.02); *H02J 3/32* (2013.01); *H02J 3/38* (2013.01); *B60L 2210/10* (2013.01); *B60L 2210/40* (2013.01); *H02J 2101/25* (2026.01)

(58) Field of Classification Search

CPC ...... H02J 3/007; H02J 3/32; H02J 3/38; H02J 2101/25; B60L 53/51; B60L 53/53; B60L 55/00; B60L 2210/10; B60L 2210/40

See application file for complete search history.

(56) References Cited

U.S. PATENT DOCUMENTS

| | | | | |
|---|---|---|---|---|
| 2021/0083506 | A1 * | 3/2021 | Rao ........................... | H02J 3/14 |
| 2022/0247184 | A1 * | 8/2022 | Kuhn ....................... | H02J 3/381 |
| 2023/0216338 | A1 | 7/2023 | Patwa et al. | |

FOREIGN PATENT DOCUMENTS

| | | | |
|---|---|---|---|
| AU | 2020202278 | A1 | 11/2020 |
| EP | 3351422 | B1 | 2/2020 |

OTHER PUBLICATIONS

Extended European Search Report for European Patent Application No. 25195929.2, dated Feb. 17, 2026, nine pages.

* cited by examiner

*Primary Examiner* — Daniel Cavallari
(74) *Attorney, Agent, or Firm* — Kinney & Lange, P.A.

(57) ABSTRACT

A system includes a breaker set, an inverter operatively connected to the breaker set, and at least one direct current (DC) voltage converter operatively connected to the inverter. A microgrid interconnection device (MID) can be operatively connected to the breaker set. A controller provides smart functionality for energy production, distribution, and control among residential sources and loads connected to the system. The controller, the breaker set, the MID, the inverter, and the at least one DC voltage converter can be housed within an enclosure.

20 Claims, 3 Drawing Sheets

SYSTEM FOR ACCOMMODATING ALTERNATING CURRENT AND DIRECT CURRENT PRODUCTION, DISTRIBUTION, AND CONTROL

BACKGROUND

1. Field

The present disclosure relates energy production, distribution, and control, and more particularly to production, distribution, and control of residential energy.

2. Description of Related Art

Typical residential power configurations involve using multiple inverters for different applications such as solar power generation, energy storage systems (ESS), and bidirectional electric vehicle (EV) charging. Each inverter typically has to be controlled separately from the others, has to have its own thermal management, and occupies its own space, e.g., on a wall or in an enclosure.

The conventional techniques have been considered satisfactory for their intended purpose. However, there is an ever-present need for improved systems and methods for improved residential energy production, distribution, and control. This disclosure provides a solution for this need.

SUMMARY

A system includes a breaker set configured to connect to at least one alternating current (AC) source and at least one AC load. An inverter is operatively connected to the breaker set. At least one direct current (DC) voltage converter is operatively connected to the inverter. The inverter and the at least one DC voltage converter are configured to receive DC power from at least one DC source, convert voltage of the power from the at least one DC source to converted DC power, to invert the converted DC power into AC power, and to provide the AC power to the breaker set. The inverter and the at least one DC voltage converter are configured to rectify AC power received from the breaker set into rectified DC power, to convert the rectified DC power into device voltage DC power, and to supply the device voltage DC power to at least one device.

A microgrid interconnection device (MID) can be operatively connected to the breaker set to selectively connect and disconnect the breaker set to and from a utility grid. The system can include an enclosure. The controller described below, the breaker set, the MID, the inverter, and the at least one DC voltage converter can be housed within the enclosure.

The breaker set can include a connection configured to connect to a generator. The breaker set can include a connection configured to connect to an AC photovoltaic (ACPV) device. The breaker set can include a connection configured to connect to an AC electric vehicle supply equipment (EVSE). The breaker set can include a connection configured to connect to a plurality of residential loads. The at least one DC voltage converter can include a connection configured to connect to a photovoltaic panel for supplying power to the utility grid and/or to the residential loads. The photovoltaic panel can be connected to a photovoltaic DC-DC converter (PV DCDC) that can be housed inside the enclosure or can be housed external to the enclosure.

The at least one DC voltage converter can include a connection configured to connect to a backup battery. The connection configured to connect to a backup battery can include a battery DC-DC converter that is housed in the enclosure or external to the enclosure. The at least one DC voltage converter can include a connection configured to connect to an electric vehicle (EV). The connection configured to connect to the EV can include an EV dispenser. The EV dispenser can be housed external to the enclosure.

A controller can be operatively connected to the breaker set, to the inverter, and to the at least one DC voltage converter to switch between a power supplier mode and a power consumer mode. In the power supplier mode, a net power flow can be from the breaker set supplied to a utility grid. In the power consumer mode, the net power flow can be into the breaker set from the utility grid.

The controller can be operatively connected to the breaker set, to the inverter, and to the at least one DC voltage converter to switch among a charging mode, a neutral mode, and a discharging mode. In the charging mode, a power flow can be from the breaker set to charge an electric vehicle (EV). In the discharging mode the power flow can be from the EV to the breaker set. In the neutral mode power flow between the EV and the breaker set can be zero.

The controller can be operatively connected to the breaker set, to the inverter, and to the at least one DC voltage converter to switch among a charging mode, a neutral mode, and a discharging mode. In the charging mode, a power flow can be from the breaker set to charge a backup/storage battery. In the discharging mode the power flow can be from the backup/storage battery to the breaker set. In the neutral mode the power flow between the backup/storage battery and the breaker set can be zero.

The controller can be operatively connected to the breaker set, to the inverter, and to the at least one DC voltage converter to distribute power one way in at least one of: distributing power from the breaker set to a plurality of residential circuits, and distributing power from an AC or DC photovoltaic panel to the breaker set. The controller can also operatively connected to distribute power bidirectionally in at least one of: distributing power bidirectionally among the utility grid and the breaker set, distributing power bidirectionally among an electric vehicle (EV) and the breaker set, and distributing power bidirectionally among a backup/storage battery and the breaker set.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
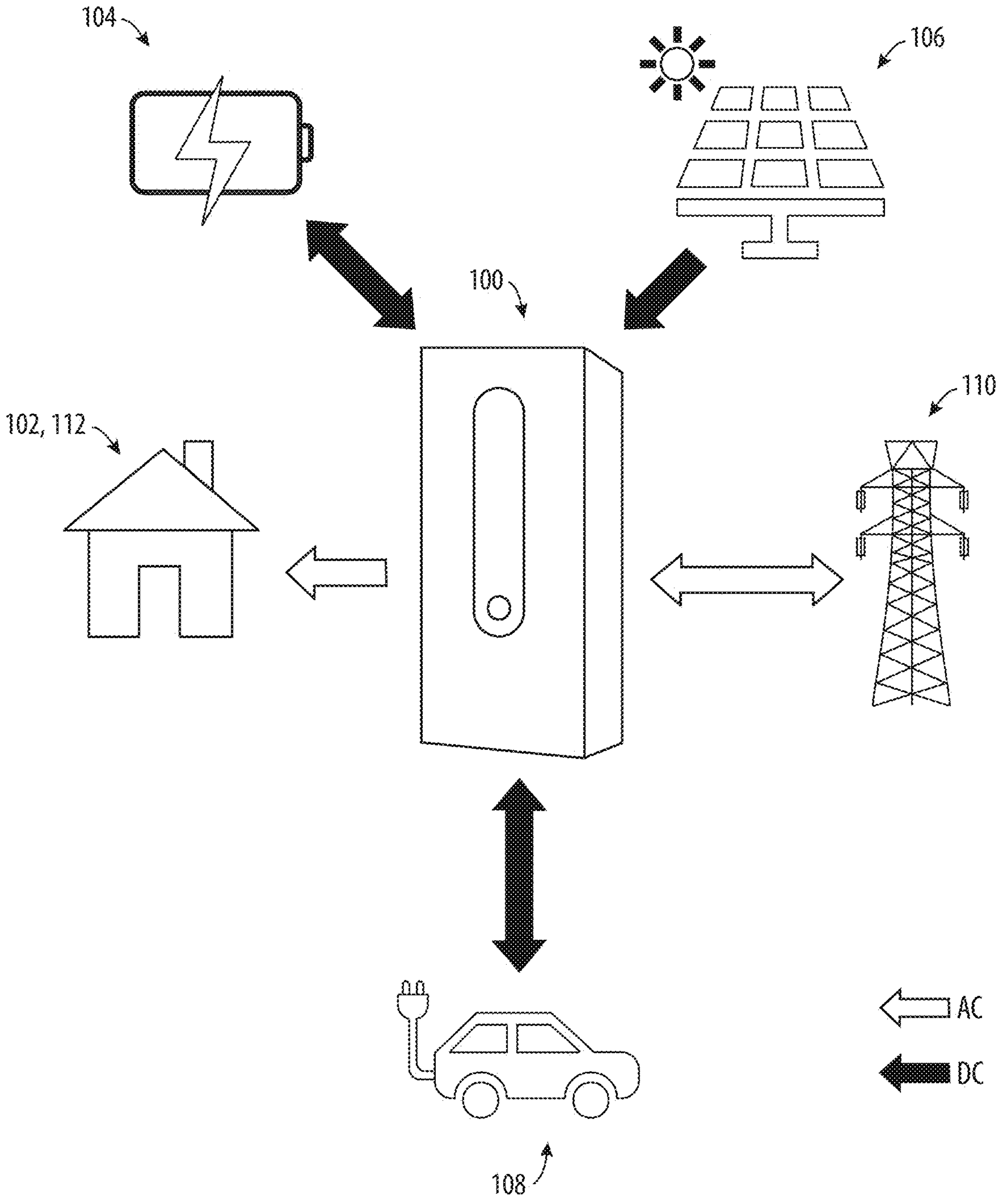
FIG. 1 is a schematic view of an embodiment of a system constructed in accordance with the present disclosure, showing the system connected with various loads and sources, including bidirectional connections and one-way connections.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to control production of power and distribution of power between residential devices, including bidirectional charging such as for electric vehicles, storage/backup batteries, and the like, as well as bidirectional energy exchange to and from a utility grid. This can all be accomplished with a single unit, e.g., that includes control and power electronics as well as circuit breakers in one enclosure.

The system 100 can be operatively connected to control and protect individual residential circuits 102. The system 100 can connect to a utility grid 110, e.g., to draw alternating current (AC) power from the utility grid to power the AC residential circuits 102. The residential circuits 102 can include e.g., the various circuits distributed throughout a residence for loads 112 such as lighting, outlets, furnace, ovens, ranges, washers/driers, air conditioning, and the like.

Direct current (DC) devices can also connect to the system 100, such as batteries 104 for backup power or storage, DC or AC photovoltaic (PC) panels 106, e.g., solar panels, and electric vehicles (EVs) 108. It is also contemplated that the system 100 can be operatively connected to other power generating devices, such as a generator 114 (labeled in FIGS. 2-5), besides the AC or DC PV devices 106. System 100 can use the power generated by such generating devices to power the residential circuits 102, charge batteries 104 and batteries of EVs 108, and/or to supply power to the utility grid 110. As indicated by the large, single head arrows in FIG. 1, the flow of power from the PV panels 106 is unidirectional from the panels to the system 100. Similarly, the flow of energy from the system 100 to the loads in the residential circuits 102 is unidirectional. However, as indicated by the double head arrows in FIG. 1, the energy flow can be bidirectional between the system 100 and each of the EV 108, the utility grid 110, and the storage/backup battery 104. The system 100 can source power for the loads in the residential circuits 102 from any of the sources 104, 106, 110, and/or 108 as needed. The system 100 can supply power to the utility grid 110 from any of the sources 106, 104, 108 as needed or beneficial. The system can also supply power to charge the batteries 104 and/or the batteries of any connected EVs 108 from any of the applicable connected sources 106, 110. The power flow between the utility grid 110 and the system 100 is AC power, as is the energy supplied from the system 100 to the residential circuits 102. The flow of energy among system 100 and devices 104, 106, 108 is DC power.

Figure 2:
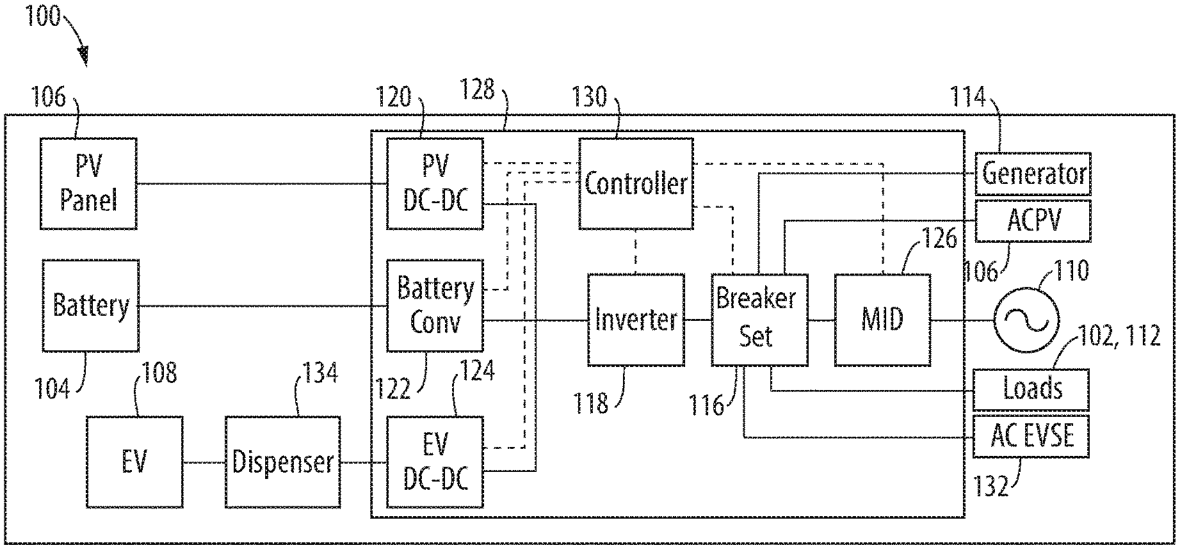
FIG. 2 is a schematic view of the system of FIG. 1, showing a configuration with a photovoltaic (PV) DC-DC converter, a storage/backup battery DC-DC converter, and an electric vehicle (EV) DC-DC converter all built into the system.

With reference now to FIG. 2, the system 100 includes a breaker set 116 configured to connect to at least one alternating current (AC) source and at least one AC load. The beaker set 116 can be a set of smart breakers, e.g., individually controllable breakers for protecting and controlling individual residential circuits 102 for powering the loads 112. The breaker set 116 can comprise a whole home electrical panel, for example.

An inverter 118 is operatively connected to the breaker set 116. At least one direct current (DC) voltage converter 120, 122, 124 is operatively connected to the inverter 118. The inverter 118 and the at least one DC voltage converter 120, 122, 124 are configured to receive DC power from at least one DC source 106, 104, 108, convert voltage of the power from the at least one DC source 106, 104, 108 to converted DC power (e.g., in the at least one DC voltage converter 120, 122, 124), to invert the converted DC power into AC power (e.g. in the inverter 118), and to provide the AC power to the breaker set 116. The inverter 118 and the at least one DC voltage converter 120, 122, 124 are configured to rectify AC power received from the breaker set 116 into rectified DC power, to convert the rectified DC power into device voltage DC power (e.g. rectifying using the inverter 118), and to supply the device voltage DC power to at least one device, e.g., to the loads 112 and/or to the utility grid 110. The inverter 118 is an inverter in the generic sense, e.g., the inverter 118 can include components for both inverting DC power into AC power, and for rectifying AC power into DC power.

A microgrid interconnection device (MID) 126 is operatively connected to the breaker set 116 to selectively connect and disconnect the breaker set 116 to and from the utility grid 110. By controlling the MID 126, the controller 130 can selectively separate the system 100 from the utility grid to run as an island, e.g. for power outages or when there is self-sufficient power generated in the residence, for shifting peak usage to off peak hours using the PV devices 106, batteries 104, and/or EV 108, or the like. The system can include an enclosure 128. The breaker set 116, the MID 126, the inverter 118, the at least one DC voltage converter 120, 122, 124, and the controller 130 described below can all be housed within the enclosure 128.

Figure 5:
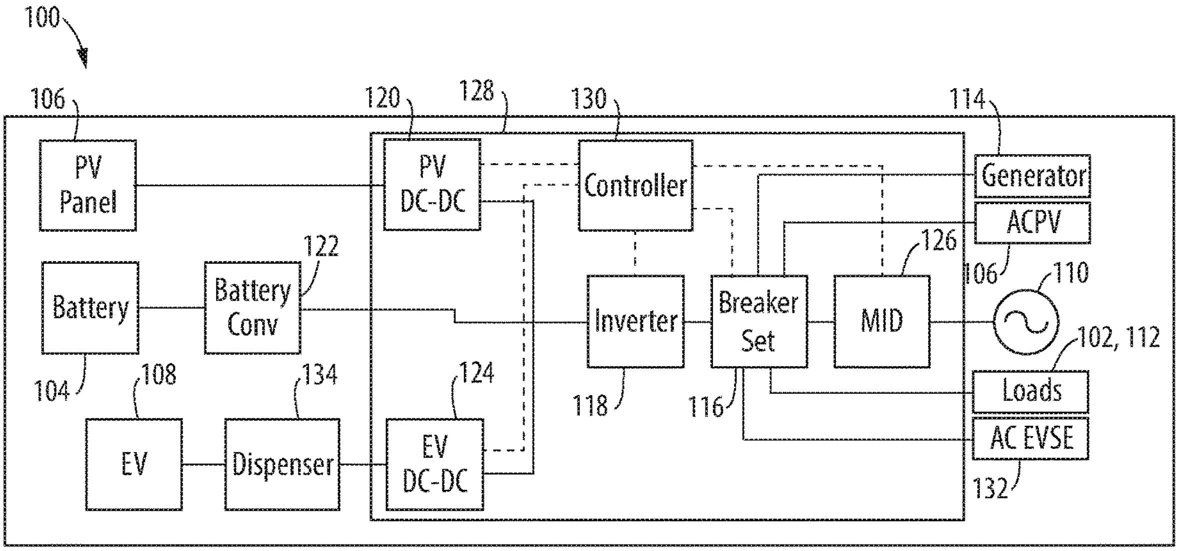
FIG. 5 is a schematic view of the system of FIG. 1, showing a configuration with a PV DC-DC converter and an EV DC-DC converter built into the system.

The breaker set 116 can include connections configured to connect to a generator 114, to a AC photovoltaic (ACPV) device 106 on the right hand side of FIG. 2 (which can be used in addition to or in lieu of the DC PV panels 106 on the left hand side of FIG. 2), and to an AC electric vehicle supply equipment (EVSE) 132, which can be used in addition to or in lieu of the DC EV dispenser 134 for bi-directional charging, where any of the AC or DC sources connected to the breaker set 116 can provide energy to charge the EV 108, and the EV 108 can provide power to supply any of the AC or DC loads connected to the breaker set 116. The breaker set includes a connection for connecting to the residential loads 112. The PV DC voltage converter 120 includes a connection configured to connect to the DC PV panel 106 for supplying power to the utility grid 110 and/or to the residential loads 112. The PV DC voltage converter 120 can include an optimizer or maximum power point tracking (MPPT) that is housed inside the enclosure 128 as shown in the configurations of FIGS. 2 and 5.

Figure 3:
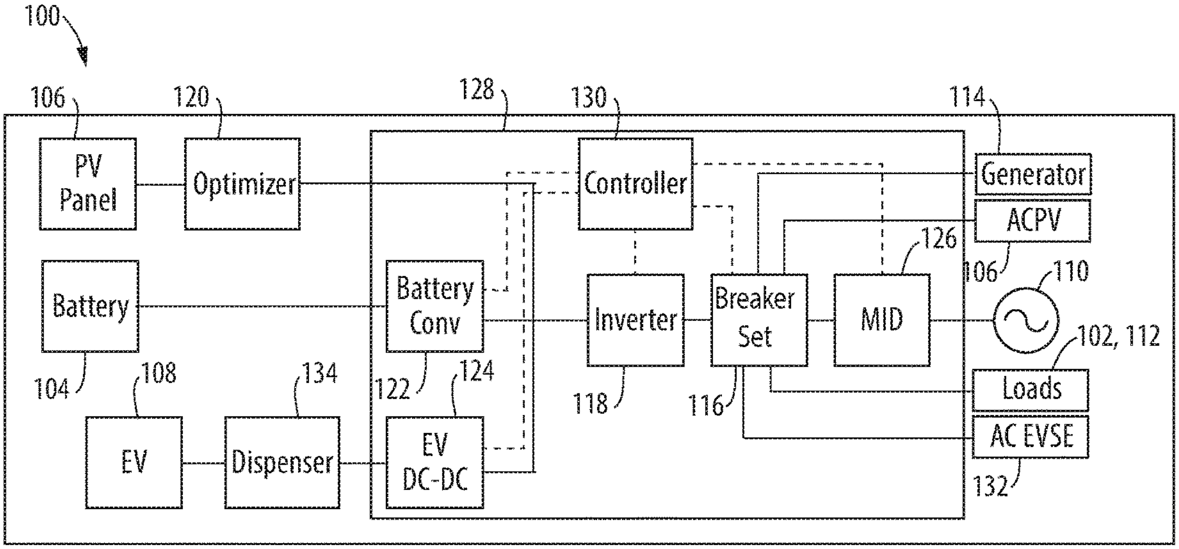
FIG. 3 is a schematic view of the system of FIG. 1, showing a configuration with a storage/backup battery DC-DC converter and an EV DC-DC converter bult into the system.
Figure 4:
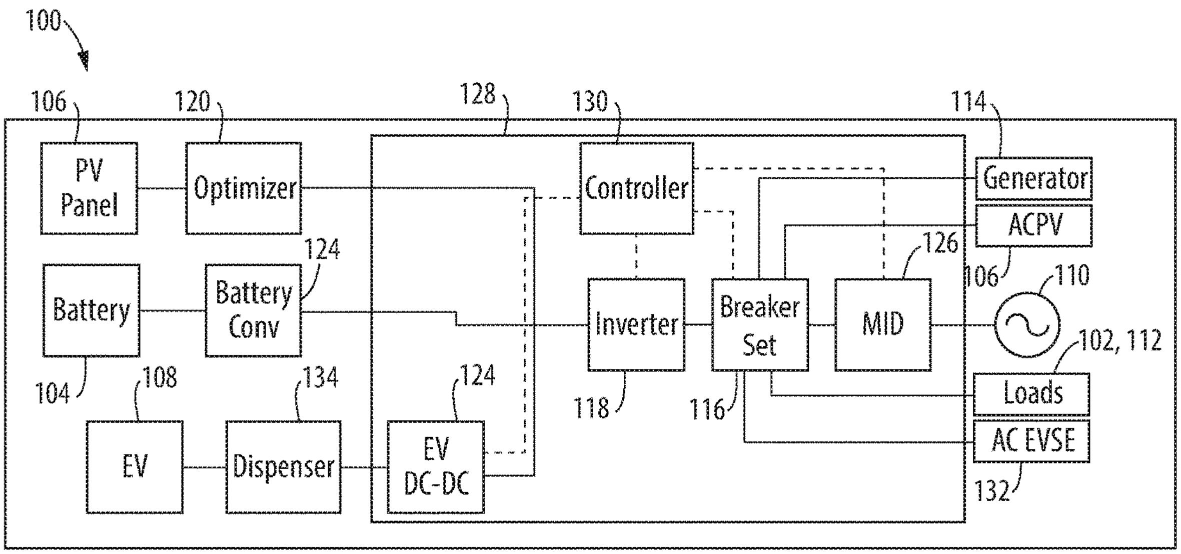
FIG. 4 is a schematic view of the system of FIG. 1, showing a configuration with an EV DC-DC converter built into the system.

Optionally, the optimizer/MPPT or PV DC converter 120 or can be external to the enclosure 128, as in the configurations of FIGS. 3 and 4.

With continued reference to FIG. 2, the DC voltage converter 122 includes a connection configured to connect to the backup/storage battery 104. The battery DC-DC converter 122 can be housed in the enclosure 128, as in the configurations of FIGS. 2-3, or external to the enclosure 128, as in the configurations of FIGS. 4-5. The EV DC voltage converter 124 includes a connection configured to connect to an EV, which can include an EV dispenser 134 external to the enclosure 128. The utility grid 110 and other devices 114, 106, 112, and 132 on the right-hand side of FIG. 2 are all external to the enclosure 128, as are the PV panel 106, battery 104, EV 108, and EV dispenser 134 on the left-hand side of FIG. 2.

As indicated by the broken lines in FIGS. 2-5, the controller 130 is operatively connected to control the breaker set 116, the inverter 118, and the DC voltage converters 120, 122, and/or 124 to switch between a power supplier mode and a power consumer mode. In the power supplier mode, a net power flow is from the breaker set 116 supplied to the utility grid 110. In the power consumer mode, the net power flow is into the breaker set 116 from the utility grid 110.

The controller 130 can operate to perform the functions described above with reference to FIG. 1. The controller 130 can be operatively connected to the breaker set 116, to the inverter 118, and to the at least one DC voltage converter 120, 122, and/or 124 to switch among a charging mode, a neutral mode, and a discharging mode. In the charging mode, a power flow is from the breaker set 116 to charge the EV 108 and/or the battery 104. In the discharging mode, the power flow is from the EV 108 and/or the battery 104 to the breaker set 116. In the neutral mode there is no power flow between the breaker set ant the EV 108 or battery 104.

The controller can be operatively connected to the breaker set 116, to the inverter 118, and to the at least one DC voltage converter 120, 122, 124 to distribute power one way in distributing power from the breaker set 116 to a plurality of residential circuits 102 for loads 112 and/or in distributing power from an AC or DC PV panels 106 to the breaker set 116. The controller can be operatively connected to distribute power bidirectionally in distributing power bidirectionally among the utility grid 110 and the breaker set 116, in distributing power bidirectionally among an EV 108 and the breaker set 116, and/or in distributing power bidirectionally among a backup/storage battery 104 and the breaker set 116.

Each of the residential circuits 102 can be individually controllable by the controller 130 using a respective smart breaker of the breaker set 116 that is connected to be individually controlled by the controller 130. Optionally, the DC-DC converters 120, 122 can either be inside or external to the enclosure 128. In the case of any DC-DC converters 120, 122, 124 being external to the enclosure, the controller 130 can optionally have a connection to control such external DC-DC converters 120, 122, 124.

The system 100 can include a neutral-point transformer. The converters (inverter/DC-DC converters can have any type/topology, as the system disclosed herein it is not a topology dependent system. The system may have automatic/manual system to enable/disable, or engage/disengage/bypass different systems as needed. Systems and methods as disclosed herein can provide a central control/communication system to improve control fidelity, and reduce communication drop issues associated with separate systems. Systems and methods as disclosed herein can be tailored to support different AC/DC sources and AC/DC loads, so the system is highly adaptable to user needs. The system can be easily configured for use in USA/Europe/India/Australia or other localizations. The systems and methods as disclosed herein can allow the end user to be more adaptable towards ever changing needs of a residential energy storage system and to be compliant with power grid as it is highly configurable. All the subsystems can be controlled externally due to simplified and centralized control.

The systems and methods disclosed herein include a first of a kind home or residential panel which has the inverter, the DC-DC converters, MID, breaker slots, and communications integrated to achieve an integrated home/residential energy solution. This can allow residential or home users to seamlessly integrate bidirectional EV, solar, and energy storage along with load control in their main panel. This is in contrast to conventional solutions which involve using multiple inverters for different applications (like solar, energy storage system (ESS) and bidirectional EV charging). The systems and methods as disclosed herein can centralize the inverter and improve the efficiency of a DC coupled architecture. They can also centralize control of distributed energy resources (DERs) and EV charging. The integrated inverter can be physically placed in the same enclosure of the main panel (e.g., the breaker set 116) in order to drive ease of wiring and overall simplification of the installation. There can be significantly improved thermal management to pack all power electronics with the main home panel. The central control can be enabled by a multi-layer system state machine and control algorithm, e.g., in the controller 130. A system 100 as disclosed herein can provide support for any suitable number of breaker slots in the load center (in breaker set 116), for an integrated transfer switch (MID 126), and/or for a built in black start battery.

The methods and systems of the present disclosure, as described above and shown in the drawings, provide for control of power production and distribution between residential devices, including bidirectional charging such as for electric vehicles, storage/backup batteries, and the like, as well as bidirectional energy exchange to and from a utility grid. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system configured to connect at least one alternating current (AC) source, at least one AC load, at least one direct current (DC) source, and at least one DC load to one another, the system comprising:

a breaker set configured to connect to the at least one AC source, the at least one AC load, and an inverter with the inverter being configured to connect to at least one DC voltage converter;

a controller operatively connected to the breaker set, the inverter, and the at least one DC voltage converter and configured to instruct the inverter and the at least one DC voltage converter to:

receive DC power from the at least one DC source, convert the DC power from the at least one DC source to converted DC power, invert the converted DC power into AC power, and provide the AC power to the breaker set, and configured to instruct the inverter and the at least one DC voltage converter to:

rectify AC power received from the breaker set into rectified DC power, convert the rectified DC power into device voltage DC power, and supply the device voltage DC power to the at least one DC load, wherein the controller is further configured to instruct the breaker set to switch between a power supplier mode that allows a net power flow from the breaker set to a utility grid that includes at least one AC load and a power consumer mode that allows the net power flow into the breaker set from the utility power grid that includes at least one AC source.

2. The system as recited in claim 1, further comprising:

a microgrid interconnection device (MID) operatively connected to the breaker set to selectively connect and disconnect the breaker set to and from the utility grid.

3. The system as recited in claim 2, further comprising;

an enclosure, wherein the breaker set, the MID, the inverter, and the at least one DC voltage converter are housed within the enclosure.

4. The system as recited in claim 1, wherein the breaker set is configured to connect to a generator.

5. The system as recited in claim 1, wherein the breaker set is configured to connect to an AC photovoltaic (ACPV) device.

6. The system as recited in claim 1, wherein the breaker set is configured to connect to an AC electric vehicle supply equipment (EVSE).

7. The system as recited in claim 1, wherein the breaker set is configured to connect to a plurality of residential loads.

8. The system as recited in claim 7, further comprising:

a photovoltaic panel, wherein the breaker set is configured to connect to the photovoltaic panel via the inverter and the at least one DC voltage converter to receive AC power therefrom and supply AC power to at least one of the utility grid and the plurality of residential loads.

9. The system as recited in claim 8, further comprising:

a photovoltaic DC-DC (PV DCDC) converter of the at least one DC voltage converter, wherein the breaker set is configured to connect to the photovoltaic panel via the inverter and the PV DCDC converter.

10. The system as recited in claim 1, wherein the breaker set is configured to connect to a battery via the inverter and the at least one DC voltage converter.

11. The system as recited in claim 10, wherein the at least one DC voltage converter includes a battery DC-DC converter that is connected to the battery.

12. The system as recited in claim 1, wherein the breaker set is configured to connect to an electric vehicle via the inverter and the at least one DC voltage converter.

13. The system as recited in claim 12, wherein the at least one DC voltage converter is configured to connect to the electric vehicle via an electric vehicle dispenser.

14. The system as recited in claim 13, wherein the electric vehicle dispenser is housed external to an enclosure that is configured to house the breaker set, the controller, the inverter, and the at least one DC voltage converter.

15. The system as recited in claim 1, wherein the controller is further configured to instruct the breaker set to switch among a charging mode that allows a power flow from the breaker set to charge an electric vehicle (EV), a discharge mode that allows the power flow from the EV to the breaker set, and a neutral mode that allows no power flow between the EV and the breaker set.

16. The system as recited in claim 1, wherein the controller is further configured to instruct the breaker set to switch among a charging mode that allows a power flow is from the breaker set to charge a backup/storage battery, a discharging mode that allows the power flow from the backup/storage battery to the breaker set, and a neutral mode that allows no power flow between the backup/storage battery and the breaker set.

17. The system as recited in claim 1, wherein the controller is further configured to instruct the breaker set to:

distribute power one way in at least one of:

distributing power from the breaker set to a plurality of residential circuits; and distributing power from an AC or DC photovoltaic panel to the breaker set; and distribute power bidirectionally in at least one of:

distributing power bidirectionally among the utility grid and the breaker set;

distributing power bidirectionally among an electric vehicle (EV) and the breaker set; and distributing power bidirectionally among a backup/storage battery and the breaker set.

18. The system as recited in claim 1, wherein the breaker set includes at least two circuit breakers configured to each receive instruction from the controller to toggle between an open position that allows the flow of power therethrough and a closed position that prevents the flow of power therethrough.

19. The system as recited in claim 1, wherein the controller includes at least one computer processor configured to provide instructions saved in computer-readable storage media associated with the controller.

20. The system as recited in claim 1, wherein the controller is configured to automatically instruct the breaker set to switch between the power supplier mode and the power consumer mode dependent upon the DC power received from the at least one DC source and the AC power received from the at least one AC source.

* * * * *